UNITED STATES PATENT OFFICE.

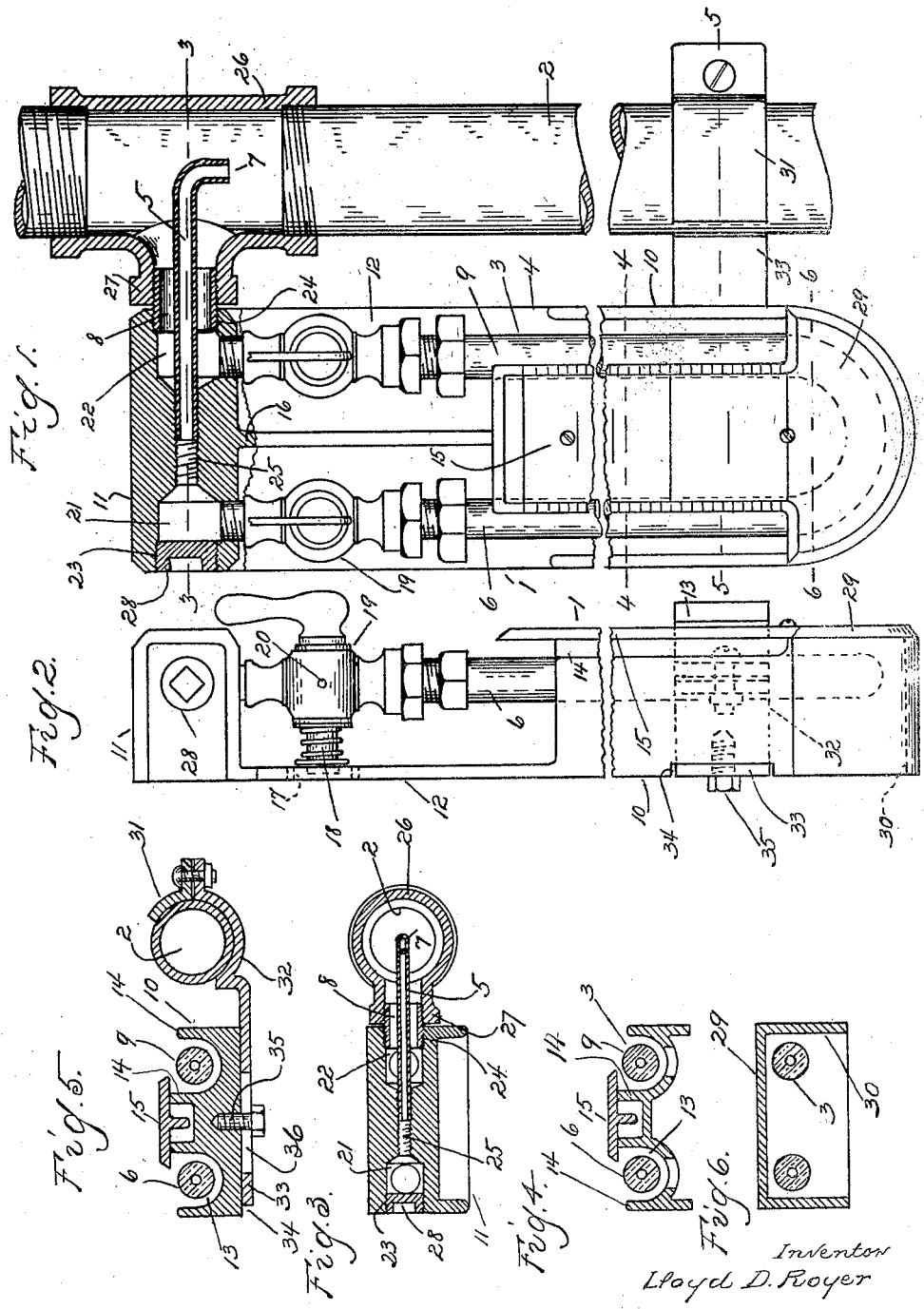

LLOYD D. ROYER, OF HIGHLAND PARK, MICHIGAN, ASSIGNOR TO SLOAN-STRIKER COMPANY, OF DETROIT, MICHIGAN, A CORPORATION OF MICHIGAN.

FLOW-INDICATOR.

1,382,388.  Specification of Letters Patent. Patented June 21, 1921.

Application filed January 2, 1919. Serial No. 269,282.

*To all whom it may concern:*

Be it known that I, LLOYD D. ROYER, a citizen of the United States of America, residing at Highland Park, in the county of Wayne and State of Michigan, have invented certain new and useful Improvements in Flow-Indicators, of which the following is a specification, reference being had therein to the accompanying drawings.

The invention relates to flow indicators of the Pitot tube type and is adapted for use in measuring the flow of either liquids or gases. In many classes of work, such as the operation of high speed rotary machines, it is very essential to know that the proper quantities of lubricating oil are being fed to the bearings and it has been found that the flow indicators heretofore used were not satisfactory, due to inaccurate operation. My construction is so arranged that these defects are overcome. Another object of the invention is to provide a simple construction which may be readily manufactured and assembled; and further, to obtain other advantages as more fully hereinafter set forth.

In the drawings:

Figure 1 is a front elevation partly in section of the flow indicator embodying my invention;

Fig. 2 is a side elevation thereof;

Figs. 3, 4, 5 and 6 are cross sections respectively on the lines 3—3, 4—4, 5—5 and 6—6 of Fig. 1.

1 is the flow indicator for measuring the flow of the fluid passing through the conduit 2. This flow indicator comprises the U-shaped glass tube 3 containing a suitable liquid, the support 4 for the U tube, the dynamic tube 5 connected with the leg 6 of the U tube and having the bent end 7 open and pointing up-stream within the conduit 2, and the static tube 8 connected with the other leg 9 of the U tube and opening into the interior of the conduit 2 at right angles to the flow of the fluid therein. As thus far described, this is the general arrangement of flow indicators of the Pitot tube type.

The support 4 for the U tube comprises the main body portion 10, the chamber portion 11 and the intermediate portion 12 of integral construction. The main body portion 10 has the longitudinally-extending grooves 13 on opposite sides of its longitudinal center for receiving the legs 6 and 9 of the U tube 3, and further has the longitudinally extending ribs 14 on opposite sides of its longitudinal center and between the legs of the U tube for supporting the scale 15, the side edges of which extend over the legs of the U tube and are suitably graduated. The intermediate portion 12 of the support has the central longitudinally-extending rib 16 and is provided with apertures 17 into which extend the ends of the valve stems 18 of the valves 19. These valves, respectively connected to the legs 6 and 9 of the U tube, have small apertures 20 extending through their side walls which, when opened, relieve the indicator from both the dynamic and static pressures. The chamber portion 11 of the support has the symmetrically arranged chambers 21 and 22 respectively connected to the legs 6 and 9 of the U tube through the relief valves 19. These chambers have the lateral openings 23 and 24 respectively and the intermediate passage-way 25 connecting the same.

For connecting the chambers with the conduit 2 the latter is provided with the T coupling 26 with the stem 27 through which extend the dynamic and static tubes 5 and 8 respectively. In detail, the dynamic tube 5 threadedly engages the intermediate passage-way 25 and the static tube 8 is a nipple substantially concentrically surrounding the dynamic tube and threadedly engaging the inner walls of the lateral opening 24 and the stem 27. The lateral opening 23 is suitably closed by the plug 28 threadedly engaging the inner wall thereof. Due to the fact that the construction of the chamber portion of the support is symmetrical, the indicator may be located on the conduit 2 at diametrically opposite points and facing in the same direction by selectively connecting the conduit to the chamber portion through one of its lateral openings and closing the other opening by the plug. The direction in which the indicator faces may also be readily reversed. Furthermore, the U tube may be either below or above the chamber portion.

For protecting the base of the U tube 3, which lies adjacent the end of the main body portion 10 of the support, the scale 15 is provided with the enlarged end 29 which has the laterally-extending peripheral flange 30 of a height substantially equal to the thickness of the main body portion, this flange surrounding the base of the U tube.

In order to secure the flow indicator 1 in place, the coöperating clips 31 and 32 are provided secured to each other at their outer ends and surrounding the conduit 2. One clip 32 has the flat portion 33 which lies in the channel 34 in the rear face of the main body portion 10 and is secured thereto by the cap bolt 35. The flat portion 33 is provided with the elongated aperture 36 through which the cap bolt extends for the purpose of permitting of lateral adjustment of the indicator with respect to the conduit.

From the above description it will be readily seen that I have provided a novel and simple construction of flow indicator which may be readily attached to the conduit on either side thereof or in reversed positions. Furthermore, since the static tube terminates in the stem of the T coupling, it will not be affected by the secondary velocity effects so that the correct static pressure may be secured.

What I claim as my invention is:

1. A flow indicator, comprising a body portion, a U-shaped tube lying adjacent to said body portion and having the base of the U extend therebeyond, a scale secured to said body portion adjacent to the legs of said U, and means upon said scale for protecting the base of the U.

2. The combination with a conduit of a flow indicator, comprising a U-tube, a support therefor, tubes opening into said conduit and respectively connecting with the legs of said U-tube, and a clip adjustably mounted upon said support and secured to said conduit for positioning said flow indicator relative to said conduit.

3. The combination with a conduit, of a flow indicator, comprising a U-tube, a support therefor having a portion provided with corresponding passage-ways connecting with the legs of said U-tube, with corresponding lateral openings into said passage-ways, and with an intermediate passage-way between said first-mentioned passage-ways, a nipple threadedly engaging the wall of one of said lateral openings and the wall of said conduit, a tube threadedly engaging the wall of said intermediate passage-way and extending substantially concentrically through said nipple into said conduit, and a plug closing the other of said lateral openings.

4. In a flow indicator, the combination with a U-tube, of a support therefor, comprising a main body portion extending adjacent to and substantially parallel with the legs of the U, and an integral chamber portion having passageways therein communicating with the legs of the U.

5. In a flow indicator, the combination with a U-shaped tube, of a support therefor, having a chamber portion provided with a pair of chambers, each connected with a leg of the U, a lateral opening into each of said chambers, and a passage intermediate said chambers, a tube engaging in one of said lateral openings and communicating with the adjacent chamber, a second tube extending through said lateral opening and engaging in said intermediate passageway and communicating with the other chamber, and means for closing the other lateral opening.

6. In a flow indicator, the combination with a U-shaped tube, of a support therefor, having a chamber portion provided with a pair of chambers, each communicating with a leg of the U, and a main body portion extending adjacent to and substantially parallel with said U-shaped tube, said main body portion extending substantially to the base of the U.

7. In a flow indicator, the combination with a member having a pair of chambers, substantially alined passageways into said chambers, and a passageway intermediate said chambers, of a tube communicating with one of said alined passageways and its respective chamber, a second tube extending through said first mentioned tube and secured in said intermediate passageway and communicating with the other chamber, means for closing the other of said alined passageways, and means for indicating the relative pressures in said chambers.

8. In a flow indicator, the combination with a member having a pair of chambers, corresponding passageways into said chambers, and another passageway intermediate said chambers, of a nipple communicating with one of said chambers, a tube extending through said nipple and adjustably secured in said intermediate passageway and communicating with the other of said chambers, a plug for closing the passageway to said last mentioned chamber, and a U-shaped tube having its legs communicating with said chambers.

9. In a flow indicator, the combination with a conduit for the passage of a fluid, of a member at the side of said conduit and having a pair of chambers, said member being symmetrical with respect to the median plane passing therethrough and extending substantially parallel to said conduit, means for selectively placing either of said chambers under the static or dynamic pressures in said conduit, and means for indicating the relative pressures in said chambers.

In testimony whereof I affix my signature.

LLOYD D. ROYER.